US010072598B2

United States Patent
Okabayashi

(10) Patent No.: US 10,072,598 B2
(45) Date of Patent: Sep. 11, 2018

(54) CONTROLLER FOR DIESEL ENGINE

(71) Applicant: DENSO CORPORATION, Kariya, Aichi-pref. (JP)

(72) Inventor: Atsunori Okabayashi, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 15/176,490

(22) Filed: Jun. 8, 2016

(65) Prior Publication Data

US 2016/0363080 A1 Dec. 15, 2016

(30) Foreign Application Priority Data

Jun. 11, 2015 (JP) ................................. 2015-118128

(51) Int. Cl.
*F02D 41/26* (2006.01)
*F02D 41/14* (2006.01)
(Continued)

(52) U.S. Cl.
CPC .......... *F02D 41/26* (2013.01); *F02D 35/023* (2013.01); *F02D 41/005* (2013.01);
(Continued)

(58) Field of Classification Search
CPC .. F02D 2250/38; F02D 41/1438; F02D 41/26; F02D 41/0025; F02B 3/06
See application file for complete search history.

(56) References Cited

U.S. PATENT DOCUMENTS 4,378,973 A * 4/1983 Sweeney ................... C10L 1/14
44/352
4,842,615 A * 6/1989 Meyer ..................... C10L 1/322
208/431

(Continued)

FOREIGN PATENT DOCUMENTS

JP 4-9759 1/1992
JP 2006-226188 8/2006
(Continued)

OTHER PUBLICATIONS

Kris Enslow, Vinayak Rakesh, Vi Rapp—Studying Combustion Chemistry: Preventing Formation of soot and other forms of pollution, Dec. 15, 2008, UC Berkeley (http://www.cchem.berkeley.edu/molsim/teaching/fall2008/combustion/index.html).*

Primary Examiner — David Hamaoui
Assistant Examiner — Kody Kight
(74) Attorney, Agent, or Firm — Nixon & Vanderhye P.C.

(57) ABSTRACT

A diesel engine is provided with a fuel injector which injects fuel into a combustion chamber. An ECU includes a parameter obtaining portion which obtains multiple property parameters indicative of a property of the fuel, and a molecular-weight computing portion which computes multiple molecular-weights based on the multiple property parameters in view of a correlation data which defines a correlation between the multiple property parameters and the multiple molecular-weights of the fuel. Further, the ECU includes a combustion-condition computing portion which computes a combustion parameter indicative of a combustion condition of the diesel engine based on the multiple molecular-weights, and a control portion which performs a combustion control based on the combustion parameter.

4 Claims, 2 Drawing Sheets

(51) Int. Cl.
  F02D 35/02 (2006.01)
  F02D 41/00 (2006.01)
  F02D 41/38 (2006.01)
  *F02D 41/40* (2006.01)
  *F02B 3/06* (2006.01)
  *F02D 13/02* (2006.01)

(52) U.S. Cl.
  CPC ..... F02D 41/1438 (2013.01); F02D 41/1467 (2013.01); F02D 41/3836 (2013.01); *F02B 3/06* (2013.01); *F02D 13/0234* (2013.01); *F02D 41/0025* (2013.01); *F02D 41/405* (2013.01); *F02D 2041/001* (2013.01); *F02D 2200/0612* (2013.01); *F02D 2250/38* (2013.01); *Y02T 10/47* (2013.01)

(56) References Cited

U.S. PATENT DOCUMENTS

| | | | |
|---|---|---|---|
| 5,027,768 A | 7/1991 | Saegusa | |
| 6,155,212 A * | 12/2000 | McAlister | F02B 43/08 123/25 B |
| 6,178,954 B1 * | 1/2001 | Kim | F02M 27/045 123/538 |
| 7,267,793 B2 * | 9/2007 | Poor | C21D 1/773 266/250 |
| 7,987,696 B2 * | 8/2011 | Kuronita | G01N 33/2829 73/35.02 |
| 8,731,797 B2 * | 5/2014 | Demougeot | F02C 7/224 701/100 |
| 9,212,058 B2 * | 12/2015 | de Graffenried, Sr. | C01B 3/342 |
| 9,476,004 B2 * | 10/2016 | Boot | C10L 1/026 |
| 9,625,153 B2 * | 4/2017 | Beran | F23R 3/002 |
| 9,719,024 B2 * | 8/2017 | Young | H04W 76/10 |
| 2008/0046128 A1 * | 2/2008 | Sasaki | F02D 35/026 700/274 |
| 2008/0110799 A1 * | 5/2008 | Matsui | C10M 169/04 208/19 |
| 2009/0145199 A1 | 6/2009 | Kuronita et al. | |
| 2011/0079194 A1 * | 4/2011 | Tanaka | F02D 41/3035 123/295 |
| 2011/0099979 A1 * | 5/2011 | Xu | C10L 1/026 60/274 |
| 2011/0160982 A1 * | 6/2011 | Kumar | F02D 41/0025 701/103 |
| 2011/0271740 A1 * | 11/2011 | Kondo | B01D 46/0086 73/28.04 |
| 2012/0046854 A1 * | 2/2012 | Sangkyu | F02D 41/0057 701/108 |
| 2012/0130622 A1 * | 5/2012 | Yamada | F02D 35/024 701/104 |
| 2015/0159565 A1 | 6/2015 | Suzuki et al. | |
| 2015/0211435 A1 * | 7/2015 | Badawy | F02D 41/403 123/480 |
| 2015/0211962 A1 * | 7/2015 | Sun | G01M 15/102 702/24 |
| 2016/0097339 A1 * | 4/2016 | Naruse | F02D 41/1467 123/435 |
| 2016/0327464 A1 * | 11/2016 | Rasmussen | G01N 9/266 |
| 2017/0248094 A1 * | 8/2017 | Zimmer | F02D 41/22 |

FOREIGN PATENT DOCUMENTS

| | | |
|---|---|---|
| JP | 2008-274905 | 11/2008 |
| JP | 2010-196576 | 9/2010 |
| JP | 2010-236492 | 10/2010 |
| JP | 2011-241280 | 12/2011 |
| JP | 2014-148906 | 8/2014 |

\* cited by examiner

CONTROLLER FOR DIESEL ENGINE

CROSS-REFERENCE TO RELATED APPLICATION

This application is based on Japanese Patent Application No. 2015-118128 filed on Jun. 11, 2015, the disclosure of which is incorporated herein by reference.

TECHNICAL FIELD

The present disclosure relates to a controller for a diesel engine.

BACKGROUND

Fuel for a diesel engine has wide property range, and a combustion condition is significantly varied according to the fuel property variation. Thus, due to the fuel property variation, a fuel injection period and a combustion period are varied, which causes deterioration in emission and a misfire. The combustion condition may become unstable.

JP-2006-226188A shows a fuel property detecting apparatus which detects the cetane value of the fuel based on the combustion condition of the fuel injected by a pilot injection.

However, even though the cetane value of the fuel is detected, it is likely that the deterioration in combustion condition may not be restricted by executing the combustion control according to the cetane value. For example, due to a variation in fuel composition, it is likely that a fuel combustion region is concentrated in a vicinity of an inner surface of a cylinder, so that it is likely that a cooling loss and an emission of soot may not be suppressed.

SUMMARY

It is an object of the present disclosure to provide a controller for a diesel engine, which is able to perform a proper combustion control even if a variation in fuel composition arises.

According to one aspect of the present disclosure, a controller for a diesel engine has a parameter obtaining portion which obtains multiple property parameters indicative of a property of the fuel; a molecular-weight computing portion which computes multiple molecular-weights based on the multiple property parameters in view of the correlation data which defines a correlation between the multiple property parameters and the multiple molecular-weights of the fuel; a combustion-condition computing portion which computes a combustion parameter indicative of a combustion condition of the diesel engine based on the multiple molecular-weights computed by the molecular-weight computing portion; and a control portion which performs a combustion control as to the fuel injected into the combustion chamber from the fuel injector, based on the combustion parameter.

The present inventor knows that a specified property parameter of the fuel has a correlation with the physical quantity of each molecular structure, and that each property parameter has an own sensitivity with respect to each molecular structure. That is, the bonding strength between molecules depends on a molecular structure of the fuel. Since the fuel contains multiple kinds of molecular structures, the property parameter changes according to the molecular-weight. Moreover, since the combustibility (ignitionability) and the produced heat are varied according to the molecular structure of the fuel, the molecular-weight of the fuel and the combustion condition have a correlation.

In the above configuration, the multiple molecular-weights are computed based on the multiple property parameters in view of the correlation data which defines the correlation between the multiple property parameters and the multiple molecular-weights. Based on the molecular-weights, the combustion parameters indicative of the combustion condition of a diesel engine is computed. Further, based on the combustion parameters, the combustion control is performed. In the correlation data, the property parameters and molecular-weights of the fuel are correlated with each other, so that the molecular-weight can be computed simply and accurately. Therefore, even when the fuel composition is varied, the proper fuel combustion control can be performed according to the variation in fuel composition.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

Figure 1:
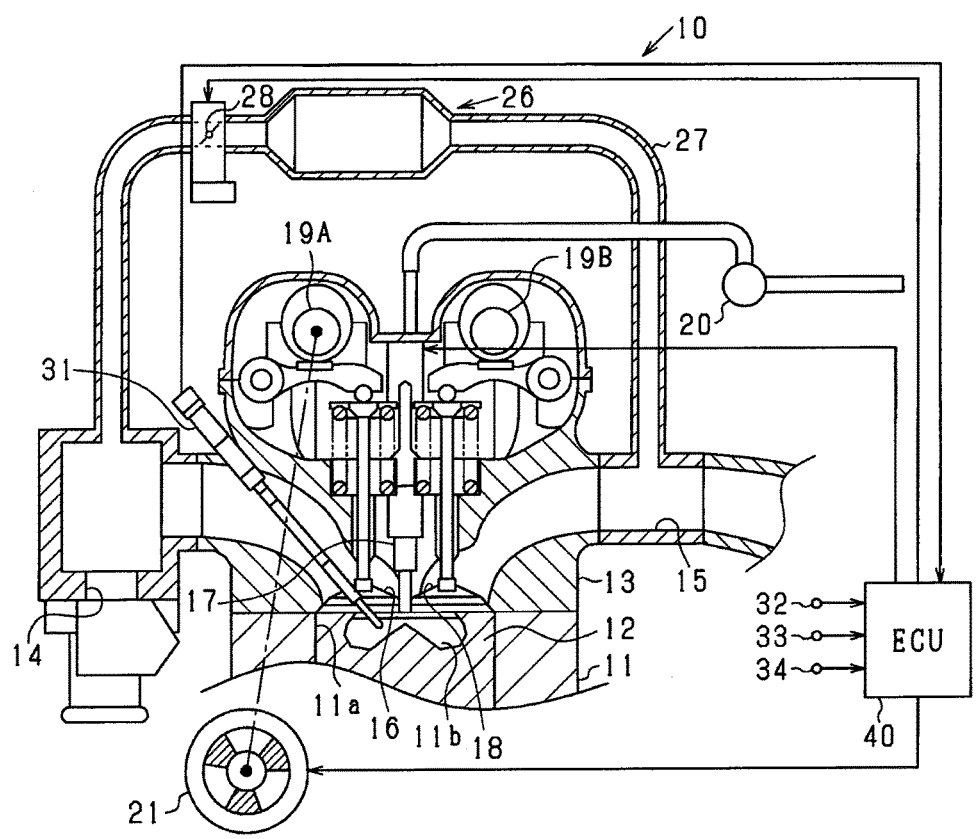
FIG. 1 is a schematic view showing a diesel engine control system.

Hereinafter, embodiments of a controller for a diesel engine will be described. The same parts and components as those in each embodiment are indicated with the same reference numerals and the same descriptions will not be reiterated.

Referring to FIG. 1, a configuration of a diesel engine 10 will be described. The diesel engine 10 is an in-series four-cylinder diesel engine. FIG. 1 shows only one cylinder. The diesel engine 10 has a cylinder block 11, a piston 12, a cylinder head 13, an intake passage 14, an exhaust passage 15, an intake valve 16, a fuel injector 17, an exhaust valve 18, a variable valve timing mechanism 21, and an EGR system 26.

The cylinder block 11 forms four cylinders 11a therein. A piston 12 reciprocates in each cylinder 11a. The cylinder head 13 is provided on the cylinder block 11. A cavity (concave) is formed on a top surface of the piston 12, which defines a combustion chamber 11b.

The intake passage 14 communicate with each cylinder 11a through a passage defined in an intake manifold and the cylinder head 13. Cam shafts 19A, 19B are rotated by a crankshaft (not shown) of the diesel engine 10. Each intake valve 16 is driven by the cam shaft 19A. According to the driving of the intake valve 16, the intake air is introduced into the combustion chamber 11b. The variable valve timing mechanism 21 adjusts a valve timing of the intake valve 16.

The exhaust passage 15 communicates with each cylinder 11a through a passage defined in an exhaust manifold and the cylinder head 13. Each exhaust valve 18 is driven by the cam shaft 19B. According to the driving of the exhaust valve 18, the exhaust gas is discharged from the combustion chamber 11b.

A common-rail 20 accumulates the high-pressure fuel therein. The high-pressure fuel is supplied to the common-rail 20 by a fuel pump (not shown). The fuel injector 17 injects the fuel in the common-rail 20 into the combustion chamber 11b. The fuel injector 17 is a well-known electromagnetic valve or a piezo drive valve which controls fuel injection quantity by controlling a pressure in a control chamber biasing the nozzle needle in a close direction. A valve-opening period of the fuel injector 17 is controlled based on an energization period of an electromagnetic actuator or a piezo drive actuator. As the valve-opening period becomes longer, the injected fuel quantity becomes larger.

The EGR system (exhaust gas recirculation system) 26 is provided with an EGR passage 27 and an EGR valve 28. The EGR passage 27 connects the exhaust passage 15 and the intake passage 14. An EGR valve 28 is provided in the EGR passage 27 to open/close the EGR passage 27. The EGR system 26 introduces a part of the exhaust gas in the exhaust passage 15 into the intake air in the intake passage 14 according to an opening degree of the EGR valve 28.

During an intake stroke, a fresh air is introduced into the cylinder 11*a* through the intake passage 14. During the compression stroke, the air is compressed by the piston 12. Around the compression top dead center, the fuel injector 17 injects the fuel into the cylinder 11*a* (combustion chamber 11*b*). During the power stroke, the injected fuel is self-ignited. During the exhaust stroke, the exhaust gas is discharged through the exhaust passage 15. A part of the exhaust gas in the exhaust passage 15 is introduced into the intake air in the intake passage 14 by the EGR system 26.

The engine 10 is provided with a cylinder pressure sensor 31. The intake pressure sensor 23 detects pressure (negative pressure) in an intake pipe. It is not always necessary to provide the cylinder pressure sensor 31 to all cylinders 11*a*. At least one of the cylinders 11*a* is provided with the cylinder pressure sensor 31. A fuel density sensor 32, a kinematic viscosity sensor 33, and a fuel quantity sensor 34 are provided to a fuel tank (not shown) of the diesel engine 10. The fuel density sensor 32 detects the density of the fuel supplied to the fuel injector 17. The fuel density sensor 32 detects the density of the fuel, for example, based on a natural vibration period measuring method. The kinematic viscosity sensors 33 are a capillary viscometer or a kinematic viscosity meter based on a thin wire heating method, which detects the kinematic viscosity of the fuel in a fuel tank. The fuel quantity sensor 34 detects the quantity of the fuel in the fuel tank. It should be noted that the fuel density sensor 32 and the kinematic viscosity sensor 33 are provided with a heater which heats the fuel up to a specified temperature. Under such a condition, the fuel density and the fuel kinematic viscosity are detected.

An electric control unit (ECU) 40 is a well-known computer having a CPU, a ROM, a RAM, a storage device 41 and an I/O, which controls the diesel engine 10.

The ECU 40 controls the fuel injector 17, the variable valve timing mechanism 21 and the EGR system 26 based on detected values of the various sensors, such as a crank angle sensor, a cooling-water-temperature sensor, an accelerator position sensor, the cylinder pressure sensor 31, the fuel density sensor 32, the kinematic viscosity sensor 33, and the fuel quantity sensor 34. Specifically, the control conditions of the fuel injector 17, the variable valve timing mechanism 21 and the EGR system 26 are adapted to optimize the fuel combustion condition for a standard property fuel. The ECU 40 controls each apparatus based on the detected values of the various sensors so as to obtain the optimum fuel combustion condition (normal combustion control).

Also, the ECU 40 performs various programs stored in the ROM, whereby the ECU 40 functions as a parameter obtaining portion, a molecular-weight computing portion, a combustion-condition computing portion, and a control portion.

The present inventor knows that a specified property parameter of the fuel has a correlation with the physical quantity of each molecular structure, and that each property parameter has an own sensitivity with respect to each molecular structure. That is, the intermolecular forces depend on the molecular structure of the fuel. Moreover, the fuel contains multiple kinds of the molecular structure. The mixing ratio is also various. In this case, since it is considered that the sensitivity to the property parameter varies among the molecular structures, the value of the property parameter varies according to the molecular-weight.

The present inventor establishes a correlation formula (1) with respect to the property parameter and the molecular structure. The formula (1) is a computing equation of a property computation model which derives multiple property parameters by reflecting a sensitivity coefficient to the multiple molecular-weights. The sensitivity coefficient indicates a dependence of the multiple molecular-weights with respect to the multiple property parameters.

$$\text{PROPERTY PARAMETER} \quad \begin{pmatrix} \text{kinematic viscosity} \\ \text{density} \\ C/H \\ \text{lower calorific value} \\ \vdots \end{pmatrix} = \quad (1)$$

$$\begin{array}{cc} \text{SENSITIVITY} & \text{MOLECULAR STRUCTURE} \\ \text{COEFFICIENT} & \\ \begin{pmatrix} a_{00} & \cdots & a_{0y} \\ \vdots & \ddots & \vdots \\ a_{x0} & \cdots & a_{xy} \end{pmatrix} \cdot & \begin{pmatrix} \text{normal paraffin quantity} \\ \text{naphthene quantity} \\ \text{isoparaffin quantity} \\ \text{aromatic quantity} \\ \vdots \end{pmatrix} \end{array}$$

In the formula (1), "a" is a sensitivity coefficient which indicates the sensitivity of each molecular structure for estimating each property parameter. The sensitivity coefficient "a" is defined as a real number including "0", according to the correlation of the property parameter and molecular structure.

Moreover, based on the formula (1), an inverse matrix of the molecular-weight can be expressed by the following formula (2).

$$\text{MOLECULAR STRUCTURE} \quad \begin{pmatrix} \text{normal paraffin quantity} \\ \text{naphthene quantity} \\ \text{isoparaffin quantity} \\ \text{aromatic quantity} \\ \vdots \end{pmatrix} = \quad (2)$$

$$\begin{array}{cc} \text{CONVERSION} & \text{PROPERTY PARAMETER} \\ \text{VALUE} & \\ \begin{pmatrix} b_{00} & \cdots & b_{0y} \\ \vdots & \ddots & \vdots \\ b_{x0} & \cdots & b_{xy} \end{pmatrix} \cdot & \begin{pmatrix} \text{kinematic viscosity} \\ \text{density} \\ C/H \\ \text{lower calorific value} \\ \vdots \end{pmatrix} \end{array}$$

In the formula (2), "b" is a conversion value which is calculated from the sensitivity coefficient "a".

Substituting a property parameter value in the formula (2), the molecular-weight contained in the fuel composition can be computed. At this time, the molecular structure which serves as a calculation target among multiple molecular structures is specified, and only the conversion value "b" necessary for computing the molecular-weight can be effective. For example, regarding to the property parameter unnecessary for computing the molecular-weight, the conversion value "b" can be "0". The conversion value "b" is also a weighting value for each property parameter. The above formula (2) is a parameter operation expression which expresses the property computation model expressed by the formula (1) with the inverse model.

A kinematic viscosity and a density of the fuel can be detected by a kinematic viscosity sensor 33 and a density sensor 32, respectively. Moreover, since a lower calorific value has a correlation with the kinematic viscosity and the density of the fuel, the lower calorific value can be computed in view of a map or an equation indicating the correlation.

Furthermore, "C/H" represents a ratio between the carbon content and the hydrogen content of the fuel. Moreover, since the ratio "C/H" has a correlation with the lower calorific value, the ratio "C/H" can be computed in view of a map or an equation indicating the correlation. In addition, it is also possible to use the cetane value and the distillation characteristics parameter (T90, T50) as the property parameter.

Moreover, since the combustibility (ignitionability) and the produced heat are varied according to the molecular structure of the fuel, the molecular-weight of the fuel and the combustion condition have a correlation. Therefore, in the present embodiment, a combustion parameter indicating the combustion condition is obtained based on the molecular-weight. Specifically, the amount of soot, and the ignition delay can be computed as the combustion parameter.

For example, according to the formula (2), the quantities of naphthene and aromatic are computed. Then, the amount of soot can be computed based on the quantities of naphthene and aromatic.

Figure 2:
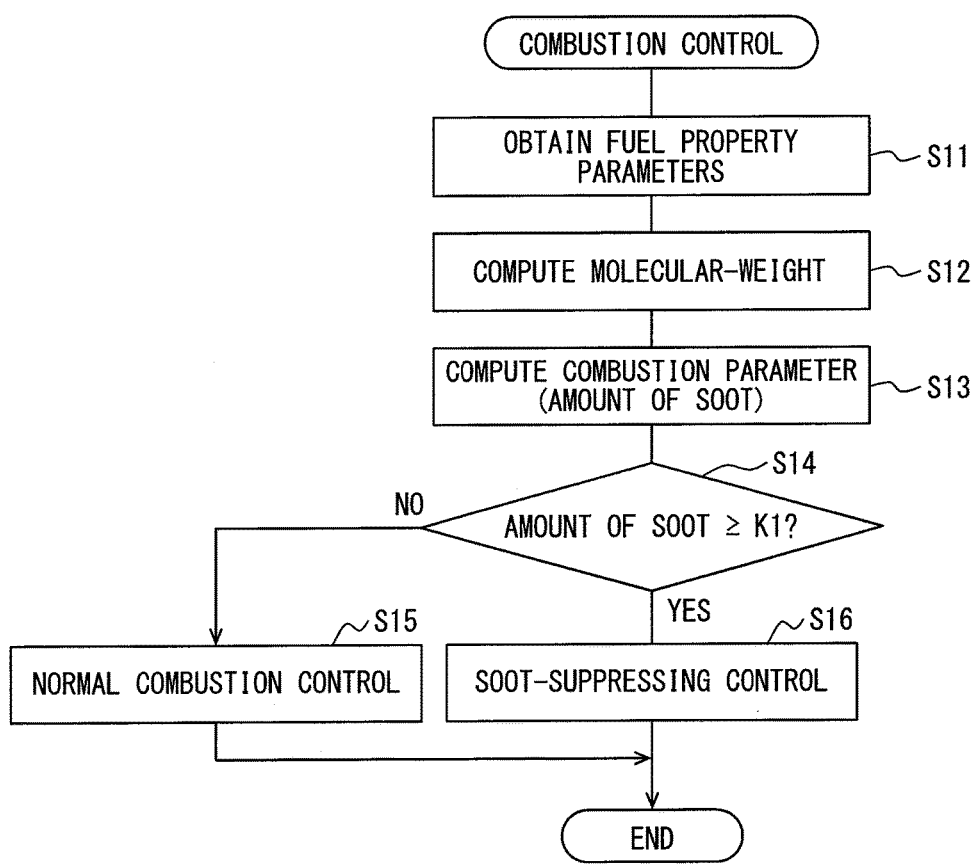
FIG. 2 is a flowchart showing a processing of a combustion control.

Referring to a flowchart shown in FIG. 2, the processing of a combustion control of the diesel engine 10 will be described hereinafter. The processing is performed in a specified interval by the ECU 40, repeatedly. It should be noted that FIG. 2, the processing for computing the molecular-weight and for estimating the combustion parameter based on the molecular-weight are performed when refueling is conducted and an engine driving condition and a vehicle running condition are stable.

In S11, various parameters about the fuel property are obtained. Specifically, the property parameters necessary for estimating the molecular-weight are obtained among the kinematic viscosity, the density, the ratio "C/H" and the lower calorific value. Then, in S12, the molecular-weight is computed according to the above formula (2).

In S13, the combustion parameter is computed based on the molecular-weight computed in S12. Specifically, the amount of soot is computed as the combustion parameter.

In S14, the ECU 40 determines whether the amount of soot is greater than or equal to a specified determination value K1. The determination value K1 is defined based on an acceptable value as the amount of soot emission of the engine 10. When the amount of soot is less than the determination value K1, the procedure proceeds to S15 in which a normal combustion control is performed. Specifically, the ECU 30 controls the injector 17, the variable valve timing mechanism 21, and the EGR system 26 based on the engine driving condition, whereby the fuel injection quantity, the opening and closing timing of the intake valve 16 and an opening degree of the EGR valve of the EGR system 26 can be adjusted. Then, the processing is terminated.

When the amount of soot is greater than or equal to the determination value K1, the procedure proceeds to S16 in which the combustion control is switched from the normal combustion control into a soot-suppressing control. In the soot-suppressing control, the fresh air quantity (oxygen quantity in the combustion chamber) is increased or the fuel injection pressure is increased so as to improve the combustion condition of the fuel. Specifically, the opening degree of the EGR valve 28 of the EGR system 26 is decreased and the intake pressure is increased by the variable valve timing mechanism 21, whereby the fresh air quantity is increased more than that in the normal combustion control. Moreover, the fuel pressure in the common-rail 20 is increased by the fuel pump, whereby the fuel injection pressure is increased. Also, as the soot-suppressing control, an after-injection may be performed. The after-injection corresponds to a fuel injection which is conducted after the main fuel injection by the fuel injector 17. The soot-suppressing control is continued until the combustion control is switched to the normal combustion control.

According to the above embodiment, following advantages can be obtained.

In the above configuration, the multiple molecular-weights are computed based on the multiple property parameters in view of the correlation data (correlation formula) which defines the correlation between the multiple property parameters and the multiple molecular-weights. Based on the molecular-weights, the combustion parameters indicative of the combustion condition of the engine 10 is computed. Further, based on the combustion parameters, the combustion control is performed. In the correlation data, the property parameters and molecular-weights of the fuel are correlated with each other, so that the molecular-weight can be computed simply and accurately. Therefore, even when the fuel composition is varied, the proper fuel combustion control can be performed according to the variation in fuel composition.

The above formula (2) is a parameter operation expression. According to the formula (2), the multiple molecular-weights are computed based on the multiple property parameters. Thereby, the molecular-weight of the fuel can be computed with high accuracy, and the combustion control can be performed properly.

Since the molecular-weight is computed by using of the multiple property parameters including at least the kinematic viscosity and the density of the fuel, the molecular-weight which is effective to compute the combustion parameters can be computed. Thus, the emissions can be reduced and the fuel economy can be improved.

The amount of soot discharged from the engine 10 is defined as the combustion parameter. When the amount of soot is excessive, the soot-suppressing control is performed. Thus, even when the amount of soot is excessive, the proper fuel combustion control can be performed.

Other Embodiment

The above-mentioned embodiment may be modified as follows.

The combustion parameter is identified and the sensitivity coefficient of the correlation data may be established according to the identified combustion parameter. For example, in S13 of the combustion control processing, the amount of soot is identified as the current combustion parameter. The molecular-weight required for computing the amount of soot is identified, and the conversion value "b" is set to "0" or a specified value.

That is, the molecular-weight necessary for computing the combustion parameter is different according to the combustion parameter. Moreover, according to the computing molecular-weight, the sensitivity coefficient of the property parameter is different. The conversion value "b" is established in view of the above, so that the computation of the molecular-weight and the fuel combustion control are properly performed.

It is not always necessary to obtain the fuel kinematic viscosity by the kinematic viscosity sensor 33. For example, the fuel pressure in the fuel passage from the common-rail 20 to the fuel injector 17 is detected by a pressure sensor, and the pressure waveform is obtained from the detected fuel pressure. The velocity of the obtained pressure waveform is computed, and the fuel density is computed based on the velocity of the obtained pressure waveform. Based on the fuel density, the fuel kinematic viscosity may be computed. JP-2014-148906A shows the above in detail. Also, the fuel pressure in the common-rail 20 is detected by the pressure sensor, and the fuel kinematic viscosity may be computed based on the pressure waveform in the common-rail 20. The fuel density may be computed according to the well-known method.

Multiple property parameters may be obtained by changing the environmental condition, such as the fuel temperature and the fuel pressure. For example, in a configuration where a fuel density sensor 32 and a kinematic viscosity sensor 33 are provided with a heater, the fuel temperature condition is varied by varying the heating condition of the heater. The fuel density and the kinematic viscosity of the fuel are detected with respect to each fuel temperature condition. In this case, the model computing equation (refer to the formulas (1) and (2)) is established with the fuel density and the kinematic viscosity under different fuel temperature conditions. Based on the model computing equation, the molecular-weight of the fuel is computed.

In S11, the multiple property parameters are obtained under different temperature conditions. In S12, the molecular-weight is computed based on the property parameters. Each molecular structure has an individual temperature characteristic. By obtaining the fuel density and the kinematic viscosity of the fuel under multiple temperature conditions, the molecular-weight can be computed in view of the temperature characteristics of each molecular structure.

By arranging the fuel density sensor 32 and the kinematic viscosity sensor 33 at multiple places where the fuel temperature and the fuel pressure are different from each other, the multiple property parameters may be obtained under different temperature conditions and different pressure conditions. In this case, each fuel property sensor is disposed on a place other than the fuel tank. For example, the fuel property sensor is arranged on a passage from the fuel feed pump to the high-pressure pump, an inside of the common-rail, and a passage from a pressure-reducing valve to a fuel tank, respectively. The fuel density and the kinematic viscosity can be obtained on different temperature conditions and different pressure conditions. Based on the obtained fuel density and the kinematic viscosity, the molecular-weight can be computed.

The multiple property parameters may be obtained under different pressure conditions. For example, the fuel density sensor 32 and the kinematic viscosity sensor 33 are respectively arranged on a low-pressure fuel portion and a high-pressure fuel portion of a fuel pump.

What is claimed is:

1. A controller for a diesel engine having a fuel injector which injects a fuel into a combustion chamber, comprising:
   a kinematic viscosity sensor configured to detect a kinematic viscosity of the fuel as one of multiple property parameters indicative of a property of the fuel;
   a density sensor configured to detect a density of the fuel as another of the multiple property parameters indicative of the property of the fuel; and
   a control unit including a processor and a storage medium storing instructions which are executable by the processor so that the control unit is configured to at least provide:
      a molecular-weight computing portion which computes multiple molecular-weights including a naphthene quantity and an aromatic quantity based on the multiple property parameters in view of correlation data which defines a correlation between the multiple property parameters and the multiple molecular-weights of the fuel;
      a combustion-condition computing portion which computes an amount of soot indicative of a combustion condition of the diesel engine based on the naphthene quantity and the aromatic quantity computed by the molecular-weight computing portion; and
      a controller which performs a combustion control in which a fresh air quantity introduced into the combustion chamber or an injection pressure of the fuel injected into the combustion chamber is increased when the amount of the soot is greater than or equal to a specified determination value.

2. The controller for a diesel engine according to claim 1, wherein
   the correlation data is a parameter operation expression expressed by an inverse calculation of a property computation model which derives the multiple property parameters by using of a sensitivity coefficient showing a dependence of the multiple molecular-weight relative to the multiple property parameters, and
   the molecular-weight computing portion computes the multiple molecular-weights based on the multiple property parameters according to the parameter operation expression.

3. The controller for a diesel engine according to claim 1, wherein
   each of the multiple property parameters is obtained under a respective condition where at least one of a fuel temperature condition and a fuel pressure condition is different from another condition, and
   the molecular-weight computing portion computes the multiple molecular-weights by using of the correlation data which defines a correlation between the multiple molecular-weights and the multiple property parameters obtained under the respective condition.

4. The controller for a diesel engine according to claim 1, wherein
   the multiple property parameters further include a ratio between a carbon content and a hydrogen content of the fuel, and a lower calorific value of the fuel.

* * * * *